(12) United States Patent
Moore

(10) Patent No.: US 7,090,238 B1
(45) Date of Patent: Aug. 15, 2006

(54) TRAILER HITCH ASSEMBLY AND METHOD

(76) Inventor: Steven D. Moore, 10502 Highway 49 South, Liberty, NC (US) 27298

( * ) Notice: Subject to any disclaimer, the term of this patent is extended or adjusted under 35 U.S.C. 154(b) by 95 days.

(21) Appl. No.: 10/776,740

(22) Filed: Feb. 11, 2004

(51) Int. Cl.
*B60D 1/00* (2006.01)

(52) U.S. Cl. .................................. 280/507
(58) Field of Classification Search .......... 280/507, 280/511, 491.1, 491.2, 491.5, 482, 514
See application file for complete search history.

(56) References Cited

U.S. PATENT DOCUMENTS

| | | | | |
|---|---|---|---|---|
| 3,796,074 A | * | 3/1974 | Vik | 70/231 |
| 4,040,641 A | * | 8/1977 | Riecke | 280/507 |
| 4,774,823 A | * | 10/1988 | Callison | 70/14 |
| 5,147,096 A | * | 9/1992 | Rogers | 280/507 |
| 5,582,420 A | * | 12/1996 | Ulbrich | 280/507 |
| 5,897,126 A | * | 4/1999 | Morris | 280/491.5 |
| 6,481,740 B1 | | 11/2002 | Haase et al. | 280/511 |
| 6,951,346 B1 | * | 10/2005 | Brackett et al. | 280/491.2 |
| 2004/0080141 A1 | | 4/2004 | Hart | 280/507 |

* cited by examiner

*Primary Examiner*—Tony Winner

(57) ABSTRACT

A hitch assembly is provided to prevent trailer towing by unauthorized persons. The hitch assembly includes a hitch catch which can be removed from a modified tongue of a conventional trailer. When the hitch catch of the tongue is removed, a tongue lock can be secured therein for additional security.

12 Claims, 5 Drawing Sheets

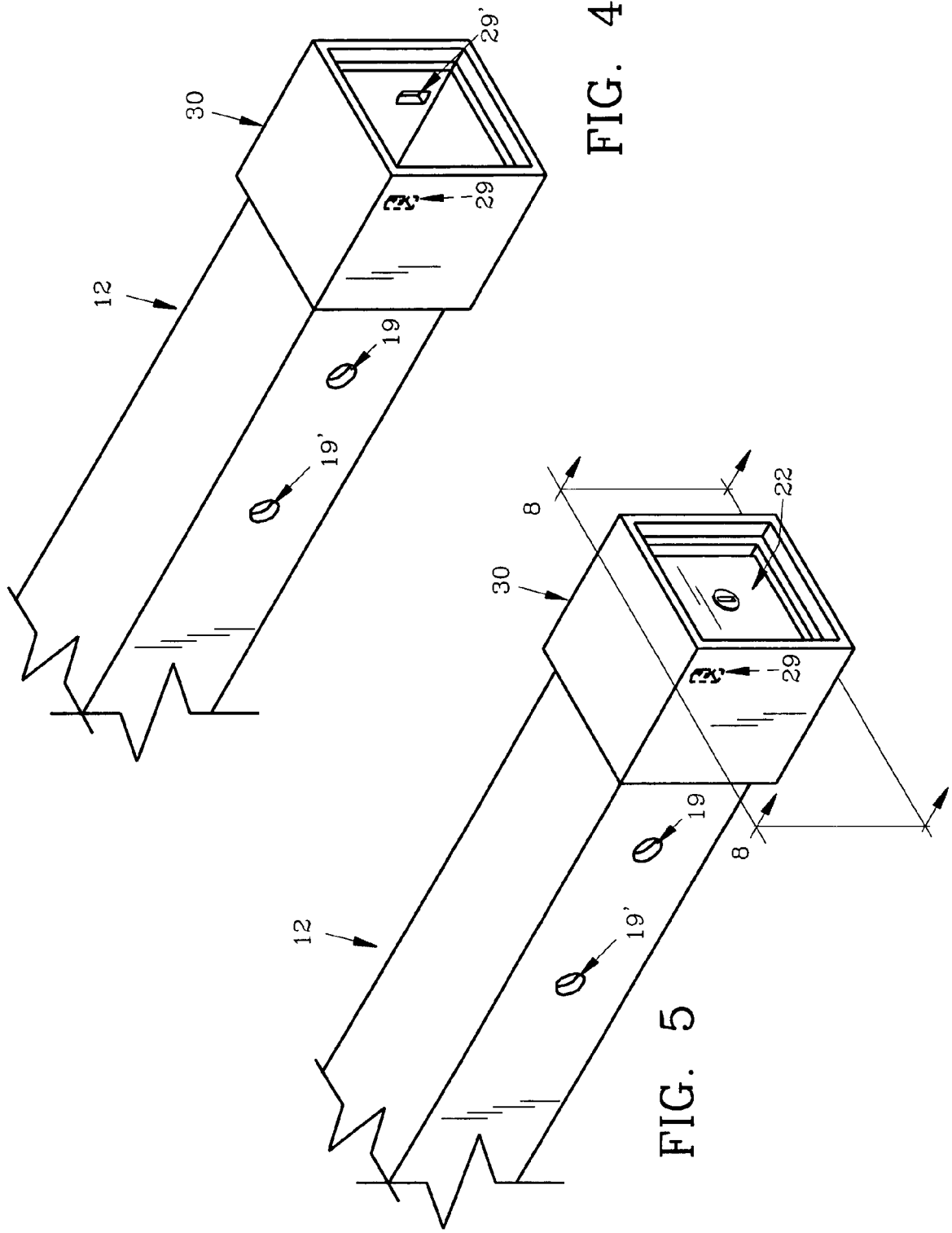

ized towing.

TRAILER HITCH ASSEMBLY AND METHOD

FIELD OF THE INVENTION

The invention herein pertains to hitch assemblies for trailers and includes a hitch catch which can be removed from the trailer tongue and the tongue locked to prevent unauthorized towing.

DESCRIPTION OF THE PRIOR ART AND OBJECTIVES OF THE INVENTION

Boat owners and others who use trailers for various items are faced with a dilemma once they uncouple the trailer from the towing vehicle. Trailers both loaded and empty are often stolen or moved by unauthorized persons that simply connect the trailer tongue to a suitable hitch on their vehicle and drive away with the trailer. This is a frequent occurrence during fishing tournaments and other times when large numbers of trailer owners gather for competitive events. Many thousands of dollars in personal property is lost as trailer owners have their trailers and other belongings stolen.

Thus, based on the problems and disadvantages of conventional trailer hitch assemblies the present invention was conceived and one of its objectives is to provide a trailer hitch assembly which can be disabled by removing part of the assembly from the trailer and storing it in a safe location.

It is another objective of the present invention to provide a trailer tongue in which a hitch catch can be easily inserted or removed as desired.

It is yet another objective of the present invention to provide a tongue lock which will prevent insertion of a hitch catch by unauthorized persons.

It is a further objective of the present invention to provide a hitch catch which will couple in a conventional manner with a standard ball hitch on a truck or other vehicle.

Various other objectives and advantages of the present invention will become apparent to those skilled in the art as a more detailed description is set forth below.

SUMMARY OF THE INVENTION

The aforesaid and other objectives are realized by providing a hitch assembly formed by modifying a standard tongue on a trailer so it will receive a hitch catch having a tubular body and ball catch. The tongue is provided with a reinforced end and apertures for coincidental alignment with apertures in the tubular body of the hitch catch for reception of pins placed therein. By removing the pins the hitch catch can be removed from the tongue and with the hitch catch removed the trailer cannot be coupled to a vehicle having a ball type hitch. To prevent unauthorized insertion of a similar hitch catch, a tongue lock is provided which can be positioned in the tongue when the hitch catch is removed. A removable key is used in the lock mechanism to rotate and secure the lock within the tongue. Upon needing the trailer for towing, the owner simply inserts the key, rotates the lock mechanism to unlock it from the tongue and removes the tongue lock therefrom. Next, the hitch catch is inserted into the tongue and is pinned in place through the provided apertures. The towing vehicle with a ball hitch can then be coupled to the trailer as usual and the trailer towed to its desired destination.

BRIEF DESCRIPTION OF THE DRAWINGS

FIG. 4 features the modified tongue as in FIG. 3 before insertion of the hitch catch;

FIG. 5 depicts the tongue as seen in FIG. 4 with the tongue lock in place;

DETAILED DESCRIPTION OF THE PREFERRED EMBODIMENT AND OPERATION OF THE INVENTION

Figure 1:
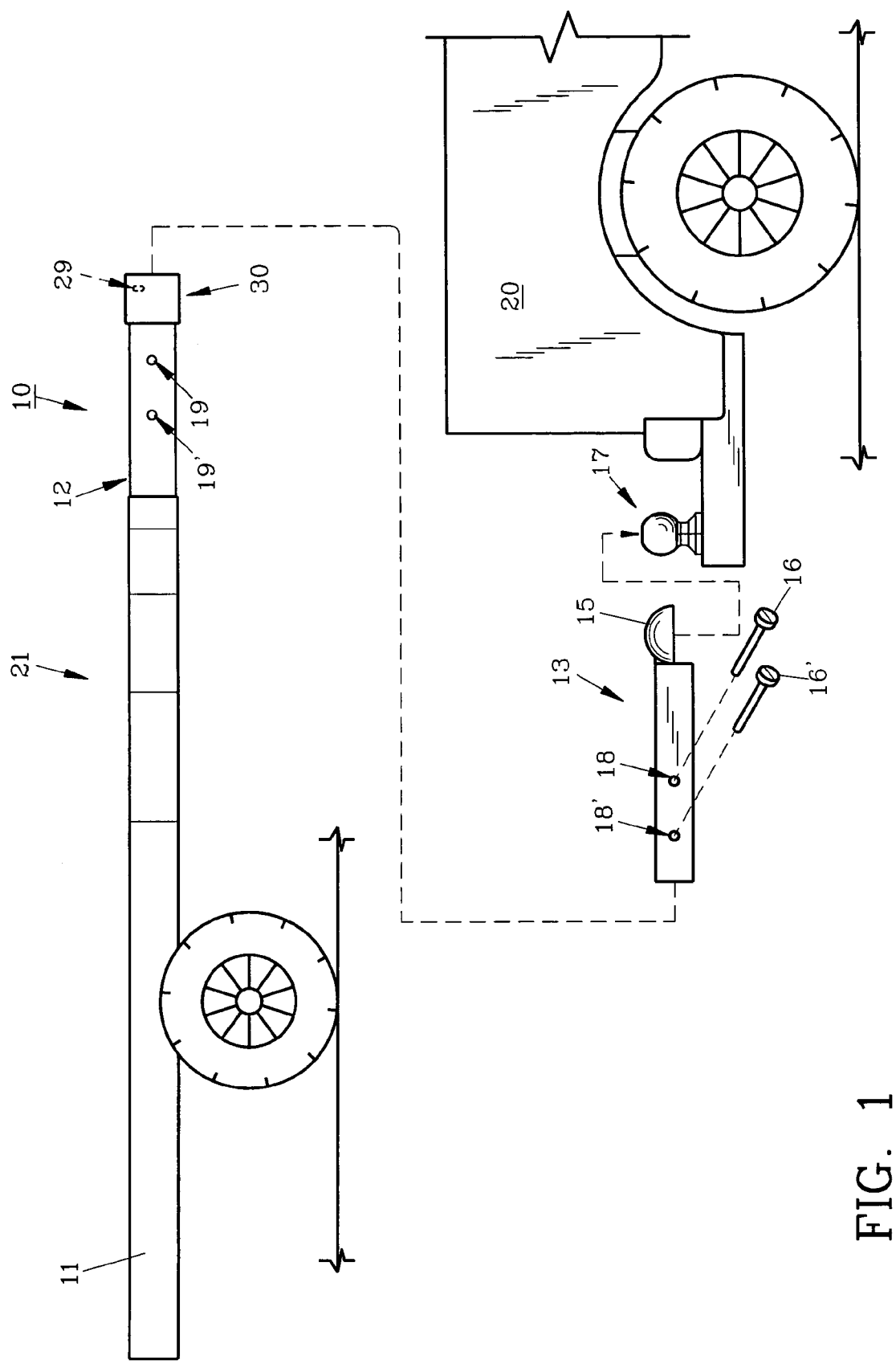
FIG. 1 illustrates a side view of a trailer with the hitch catch exploded therefrom for attachment to a pickup truck.
Figure 2:
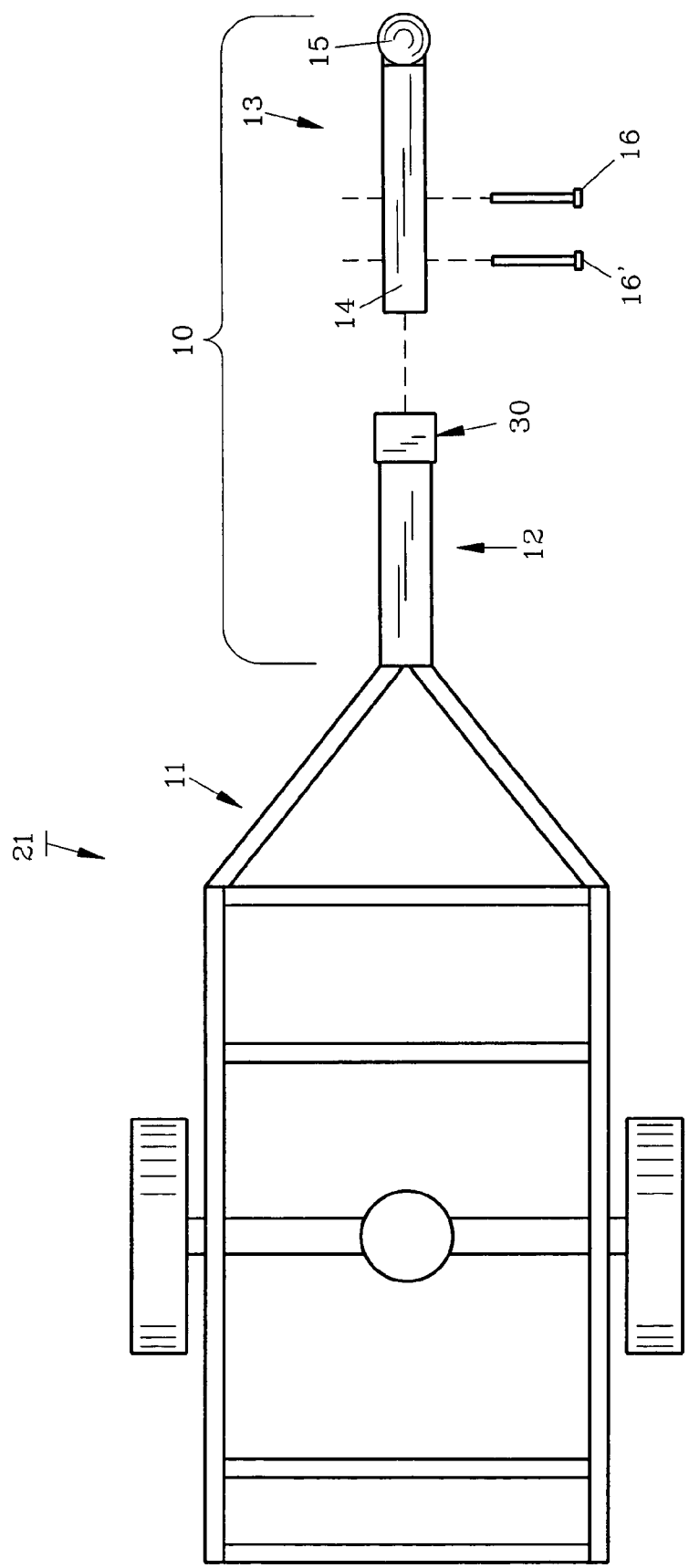
FIG. 2 shows a top view of the trailer and the hitch assembly as seen in FIG. 1 before insertion of the hitch catch into the tongue.

For a better understanding of the invention and its operation, turning now to the drawings, FIG. 1 demonstrates trailer 21 which may be built for hauling small boats (not seen) or the like having a frame 11 formed of steel, aluminum or other suitable materials. Trailer 21 as seen in FIG. 2 can be for example, a conventional trailer modified for use with preferred hitch assembly 10 including tongue 12 with reinforced end 30 and hitch catch 13. Hitch catch 13 consists of a steel tubular body 14 sized to slide within steel tubular tongue 12. Standard steel ball catch 15 is attached to tubular body 14 such as by welding or the like. As seen in FIG. 1, apertures 18, 18' of hitch catch 13 and apertures 19, 19' of tongue 12 can be aligned to allow pins 16, 16' to be positioned therein for retaining hitch catch 13 within tongue 12. Ball catch 15 is a standard ball catch as used with conventional truck ball hitch 17 on typical pickup truck 20, shown fragmented in FIG. 1.

Figure 3:
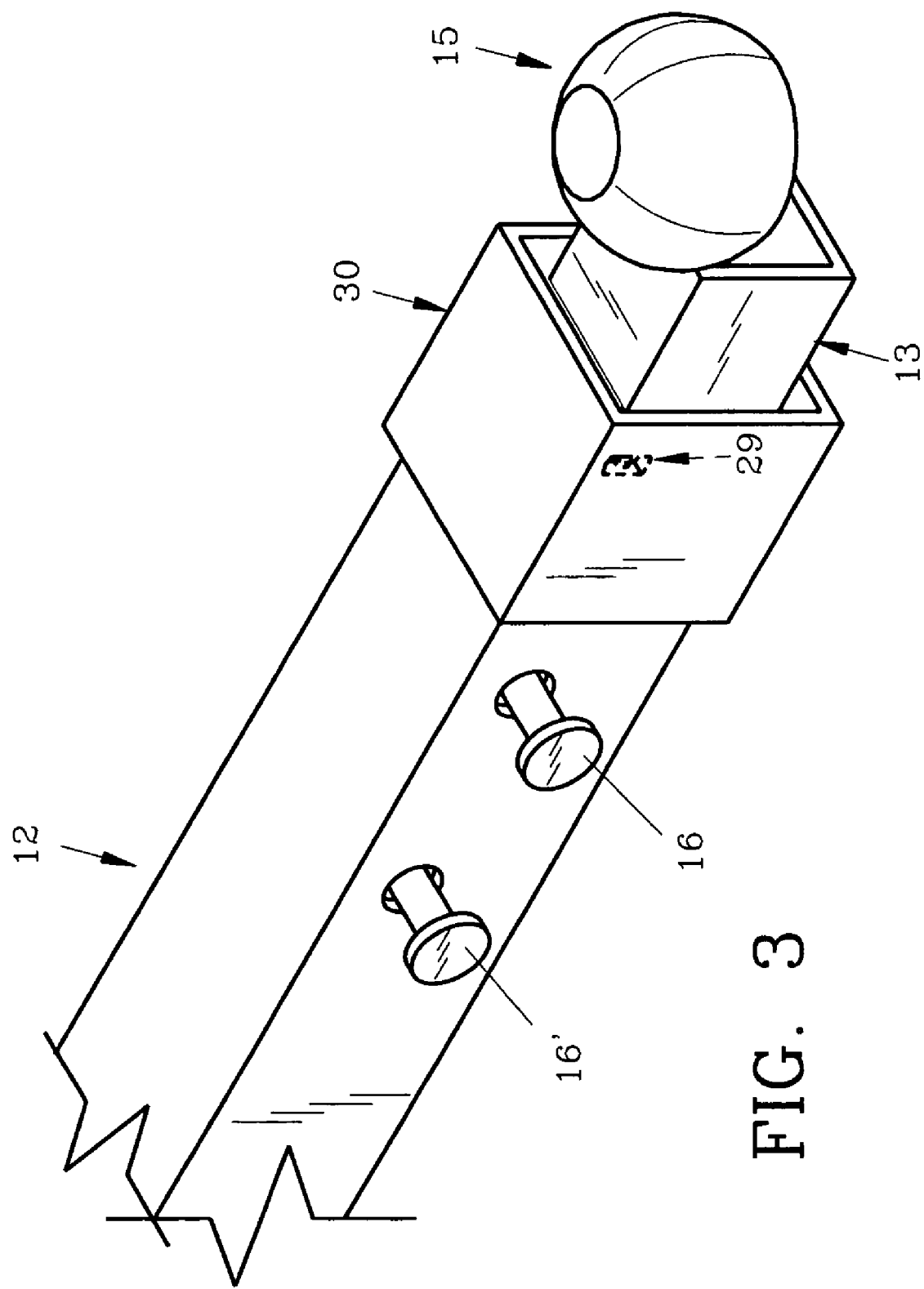
FIG. 3 demonstrates an enlarged view of the hitch catch positioned inside a modified, fragmented tongue.

In FIG. 3, tongue 12 is shown in fragmented fashion having hitch catch 13 positioned therein with pins 16, 16' in place to maintain hitch catch 13. In FIG. 4 fragmented tongue 12 is shown with hitch catch 13 removed.

Figure 6:
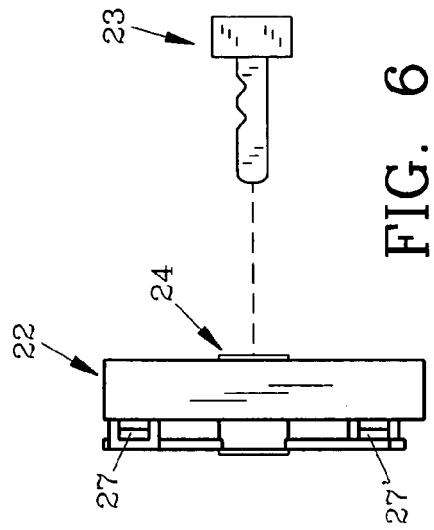
FIG. 6 shows a side view of the tongue lock with the key removed therefrom.

As shown in FIG. 5 tongue lock 22 is positioned in tongue 12 to prevent unauthorized placement of hitch catch 13 therein. Tongue lock 22 includes lock mechanism 28, lock arms 27, 27' and key channel 24 for receiving key 23. In FIG. 6, tongue lock 22 is shown in a side elevational view with key 23 removed from key channel 24. Shown in FIG. 7, tongue lock 22 is in a locked position within tongue 12, having first retractable lock arm 27 and second retractable lock arm 27' extending respectively through arm openings 29, 29' of tongue 12.

Figure 8A:
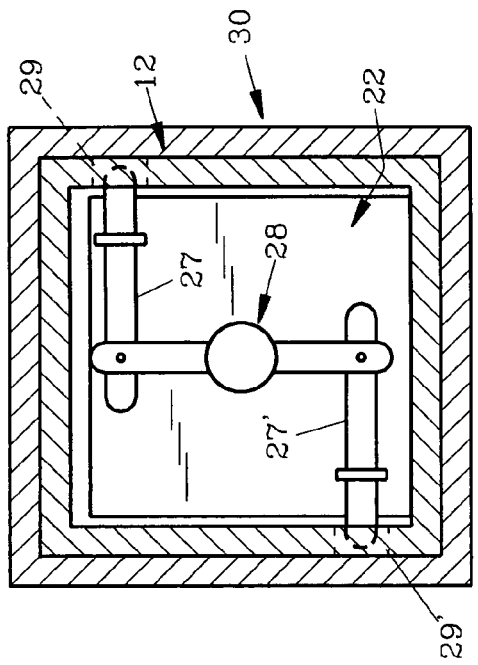
FIG. 8A depicts a rear view of the tongue lock in an unlocked position generally along lines 8—8 of FIG. 5.
Figure 7:
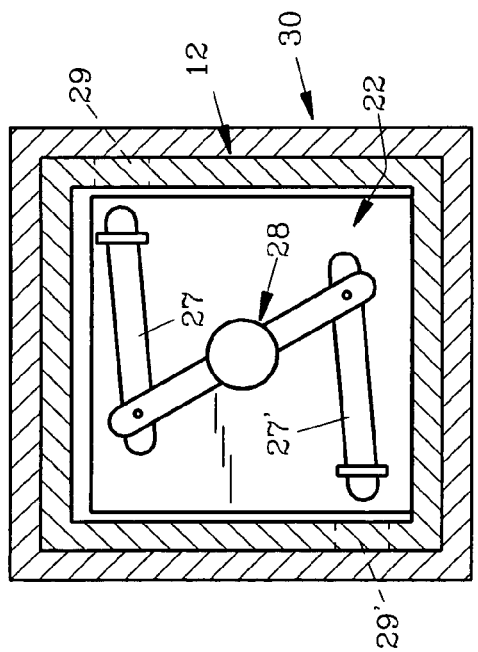
FIG. 7 pictures a front view of the tongue lock within the tongue in a locked posture.
Figure 8B:
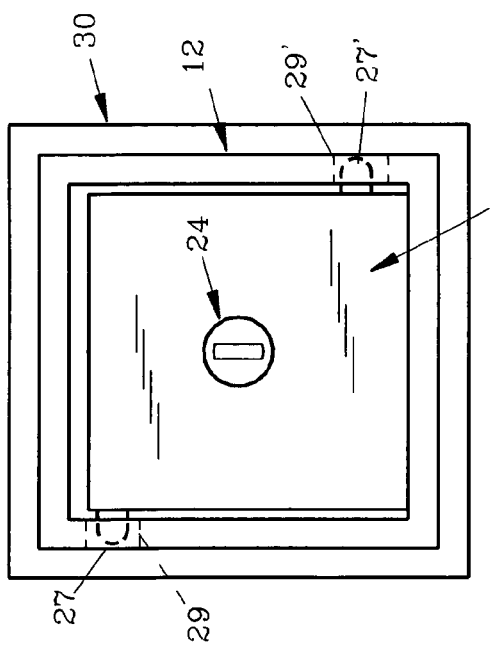
FIG. 8B demonstrates the tongue lock as shown in FIG. 8A in a fully locked position.

In FIG. 8A, generally along lines 8—8 in FIG. 5, lock arms 27, 27' are shown in an unlocked position. In FIG. 8B, lock arms 27, 27' have been extended and pass through arm openings 29, 29' of tongue 12 as also seen in FIG. 7. Reinforced end 30 of tongue 12 prevents access to openings 29, 29' and lock arms 27, 27' for security purposes. As would be understood, lock mechanism 28 is rotatable by the insertion of key 23 as shown in FIG. 6. Upon rotation, lock arms 27, 27' extend through respectively arm openings 29, 29' of tongue 12 to maintain lock 22 within tongue 12. When lock 22 is in place in tongue 12, hitch catch 13 cannot be placed therein, thus providing security to the trailer owner. When the owner decides to use trailer 21, key 23 is inserted into key channel 24 and lock mechanism 28 is rotated to draw lock arms 27, 27' from openings 29, 29' respectively, whereby lock 22 can then be manually removed from tongue 12. Hitch catch 13 is then placed within tongue 12, pins 16, 16' inserted whereby trailer 21 can then be coupled to ball hitch 17 of pickup truck 20 and secured thereto with a security chain or otherwise as usual.

Variations of the illustrated embodiments are anticipated and may include other types of truck to trailer coupling configurations, other than the preferred hitch catch and standard ball hitch shown. Also, other tongue shapes and designs may also be used. Thus, the illustrations and examples provided herein are for explanatory purposes and are not intended to limit the scope of the appended claims.

I claim:

1. A trailer hitch assembly comprising: a trailer tongue, a hitch catch, said hitch catch releasably connected to said trailer tongue, said hitch catch for coupling to a towing vehicle, a tongue lock, said tongue lock for insertion into said trailer tongue when said hitch catch is removed from said trailer tongue, said tongue lock comprising a pair of retractable arms.

2. The trailer hitch assembly of claim 1 wherein said tongue lock is key operated.

3. The trailer hitch assembly of claim 1 further comprising a pin, said pin for connecting said hitch catch to said trailer tongue.

4. A trailer hitch assembly for coupling with a trailer hitch on a towing vehicle comprising: a tubular trailer tongue, a hitch catch, said hitch catch comprising a tubular body sized to slide within said trailer tongue, and a ball catch, said ball catch attached to said tubular body, a tongue lock, said tongue lock for insertion into said trailer tongue when said hitch catch is removed therefrom, said tongue lock comprising a first and a second retractable arm.

5. The trailer hitch assembly of claim 4 wherein said trailer tongue defines an arm opening, said arm opening for receiving one of said retractable arms.

6. The trailer hitch assembly of claim 4 wherein said tongue lock comprises a rotatable lock.

7. The trailer hitch assembly of claim 4 wherein said trailer tongue defines a pair of arm openings, said first and said second retractable arms for positioning in said pair of arm openings.

8. A method of coupling a trailer with a trailer tongue to a towing vehicle having an attached hitch comprising the steps of:
   a) modifying the trailer tongue to receive a hitch catch therein;
   b) placing a hitch catch within the trailer tongue;
   c) coupling the hitch catch to the towing vehicle;
   d) removing the hitch catch from the trailer tongue;
   e) obstructing the trailer tongue with a tongue lock having a pair of retractable arms; and
   f) extending the pair of retractable arms from the tongue lock to secure the tongue lock within the trailer tongue.

9. The method of claim 8 wherein removing the hitch catch from the trailer tongue comprises the step of inserting a rotatable tongue lock therein.

10. The method of claim 9 further comprising the step of locking the trailer tongue by extending the pair of retractable arms from the tongue lock through arm openings in the trailer tongue.

11. The method of claim 8 wherein obstructing the trailer tongue comprises the step of inserting a tongue lock having a key operated retractable arms.

12. The method of claim 11 further comprises the step of rotating the tongue lock with a key to extend the retractable arms.

* * * * *